US012041392B2

(12) United States Patent
Inoue et al.

(10) Patent No.: US 12,041,392 B2
(45) Date of Patent: Jul. 16, 2024

(54) PROJECTION SYSTEM, PROJECTION METHOD, AND CONTROL PROGRAM

(71) Applicant: FUJIFILM Corporation, Tokyo (JP)

(72) Inventors: Kazuki Inoue, Saitama (JP); Tomonori Masuda, Saitama (JP); Akihiro Ishizuka, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 151 days.

(21) Appl. No.: 17/898,832

(22) Filed: Aug. 30, 2022

(65) Prior Publication Data

US 2022/0417481 A1 Dec. 29, 2022

Related U.S. Application Data

(63) Continuation of application No. PCT/JP2021/003431, filed on Jan. 29, 2021.

(30) Foreign Application Priority Data

Mar. 9, 2020 (JP) ................................ 2020-040022

(51) Int. Cl.
*H04N 9/31* (2006.01)
*G03B 21/14* (2006.01)

(52) U.S. Cl.
CPC ......... *H04N 9/3185* (2013.01); *H04N 9/3147* (2013.01); *H04N 9/3158* (2013.01)

(58) Field of Classification Search
CPC .... H04N 9/3147; H04N 9/3185; G03B 21/14; G03B 21/145; G03B 21/147
See application file for complete search history.

(56) References Cited

U.S. PATENT DOCUMENTS

| | | | |
|---|---|---|---|
| 2015/0138240 | A1 | 5/2015 | Hiranuma |
| 2017/0041580 | A1 | 2/2017 | Ohira et al. |
| 2017/0070711 | A1 | 3/2017 | Grundhofer et al. |
| 2018/0343426 | A1 | 11/2018 | Wada et al. |
| 2019/0104291 | A1 | 4/2019 | Lin et al. |

FOREIGN PATENT DOCUMENTS

| | | | |
|---|---|---|---|
| JP | 2013-68742 | A | 4/2013 |
| JP | 2015-121779 | A | 7/2015 |
| JP | 2015-206950 | A | 11/2015 |

(Continued)

OTHER PUBLICATIONS

International Preliminary Report on Patentability (Form PCT/IPEA/409) for International Application No. PCT/JP2021/003431, dated Sep. 2, 2021, with English translation.

(Continued)

*Primary Examiner* — Ryan D Howard
(74) *Attorney, Agent, or Firm* — Birch, Stewart, Kolasch & Birch, LLP

(57) ABSTRACT

A projection system performs projection so that a projection range of a first projection portion and a projection range of a second projection portion are partially overlapped with each other, and includes a processor configured to: perform a control of shifting, from the first state as defined herein, to the second state as defined herein; and execute a control of adjusting a relative position between a first projection range of the first projection portion and a second projection range of the second projection portion in accordance with a received instruction.

22 Claims, 10 Drawing Sheets

(56) References Cited

FOREIGN PATENT DOCUMENTS

| | | | |
|---|---|---|---|
| JP | 2018-54763 | A | 4/2018 |
| JP | 2018-152663 | A | 9/2018 |
| JP | 2018-197824 | A | 12/2018 |

OTHER PUBLICATIONS

International Search Report (Form PCT/ISA/210) for International Application No. PCT/JP2021/003431, dated Apr. 20, 2021, with English translation.

Written Opinion of the International Searching Authority (Form PCT/ISA/237) for International Application No. PCT/JP2021/003431, dated Apr. 20, 2021.

PROJECTION SYSTEM, PROJECTION METHOD, AND CONTROL PROGRAM

CROSS REFERENCE TO RELATED APPLICATION

This is a continuation of International Application No. PCT/JP2021/003431 filed on Jan. 29, 2021, and claims priority from Japanese Patent Application No. 2020-040022 filed on Mar. 9, 2020, the entire disclosures of which are incorporated herein by reference.

BACKGROUND OF THE INVENTION

1. Field of the Invention

The present invention relates to a projection system, a projection method, and a computer readable medium storing a control program.

2. Description of the Related Art

JP2015-121779A discloses a configuration in which a projector displays a guide figure that is referred to in correcting a position of the projector in a system that projects one image using a plurality of projection type display devices.

SUMMARY OF THE INVENTION

One embodiment according to the disclosed technology provides a projection system, a projection method, and a computer readable medium storing a control program that efficiently adjust a relative position of each projection range of a plurality of projection portions.

A projection system according to an aspect of the present invention is a projection system that projects a projection range of a first projection portion and a projection range of a second projection portion in a partially overlapping manner, the projection system comprising a processor configured to perform a control of projecting a first adjustment image or a second adjustment image different from the first adjustment image from the first projection portion and the second projection portion and execute a control of adjusting a relative position between a first projection range of the first projection portion and a second projection range of the second projection portion in accordance with a received instruction.

A projection method according to another aspect of the present invention is a projection method by a projection system that projects a projection range of a first projection portion and a projection range of a second projection portion in a partially overlapping manner, the projection method comprising, by a processor included in the projection system, performing a control of projecting a first adjustment image or a second adjustment image different from the first adjustment image from the first projection portion and the second projection portion and executing a control of adjusting a relative position between a first projection range of the first projection portion and a second projection range of the second projection portion in accordance with a received instruction.

A control program stored in a computer readable medium according to still another aspect of the present invention is a control program of a projection system that projects a projection range of a first projection portion and a projection range of a second projection portion in a partially overlapping manner, the control program causing a processor included in the projection system to execute a process comprising performing a control of projecting a first adjustment image or a second adjustment image different from the first adjustment image from the first projection portion and the second projection portion and executing a control of adjusting a relative position between a first projection range of the first projection portion and a second projection range of the second projection portion in accordance with a received instruction.

According to the present invention, a projection system, a projection method, and a control program that can efficiently adjust a relative position of each projection range of a plurality of projection portions can be provided.

DESCRIPTION OF THE PREFERRED EMBODIMENTS

In a case of performing projection by making each projection range of a plurality of projection portions partially overlap, overlapping regions that overlap with each other are set in advance in each projection range of the plurality of projection portions, and each image projected from the plurality of projection portions is generated based on the set overlapping regions. Accordingly, a relative position of each projection range of the plurality of projection portions needs to be adjusted so that the overlapping regions set in each projection range of the plurality of projection portions accurately overlap with each other. However, in the technology of the related art, the relative position of each projection range of the plurality of projection portions cannot be efficiently adjusted.

For example, in a method of displaying a reference cursor (a mark "+") and a guide cursor (a mark "X") and moving a position of a projector to match both of the reference cursor and the guide cursor as in JP2015-121779A, increasing each cursor to be displayed makes each cursor easily visible, and a user easily recognizes approximate misregistration between projectors. However, recognizing minute misregistration between the projectors is difficult for the user. In addition, in a case where each cursor to be displayed is decreased, the user easily recognizes minute misregistration between the projectors. However, each cursor is not easily visible. Thus, recognizing approximate misregistration between the projectors is difficult for the user.

In addition, while a configuration in which the relative position of each projection range of the plurality of projection portions is automatically adjusted based on an image obtained by an imaging portion that images each projection range is considered, such a configuration poses problems of an increase in size and a high cost of an apparatus because of the imaging portion.

Hereinafter, an embodiment of the present invention for solving these problems will be described with reference to the drawings.

<Schematic Configuration of Projection System 10 that is Embodiment of Projection System According to Present Invention>

Figure 1:
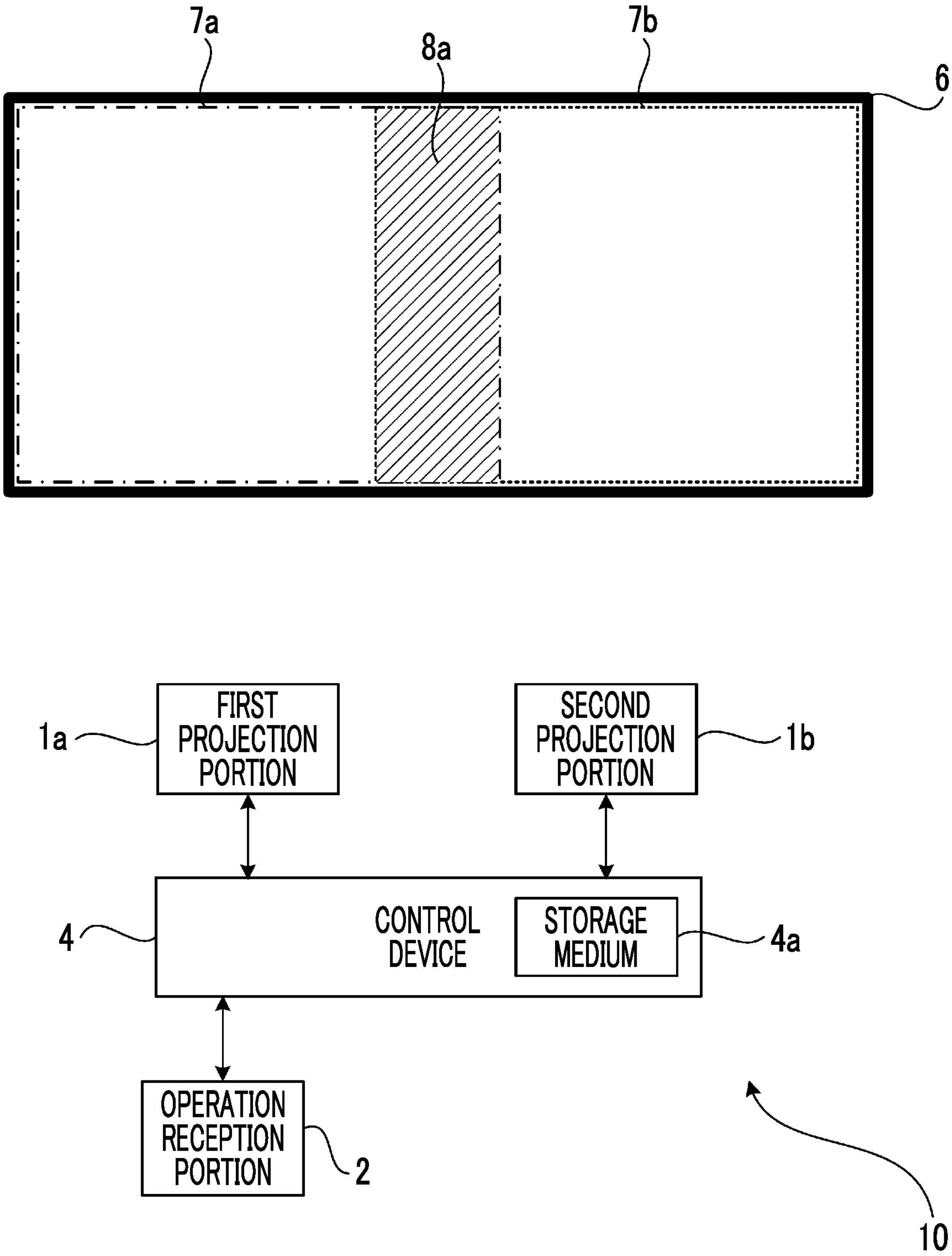
FIG. 1 is a schematic diagram illustrating a schematic configuration of a projection system 10 that is an embodiment of a projection system according to the present invention.

FIG. 1 is a schematic diagram illustrating a schematic configuration of a projection system 10 that is an embodiment of a projection system according to the present invention.

The projection system 10 comprises a first projection portion 1*a* and a second projection portion 1*b*, a control device 4, a screen 6, and an operation reception portion 2. Each of the first projection portion 1*a* and the second projection portion 1*b* is composed of, for example, a liquid crystal projector or a projector using liquid crystal on silicon (LCOS). Hereinafter, each of the first projection portion 1*a* and the second projection portion 1*b* will be described as a liquid crystal projector.

The control device 4 is a device including a control portion composed of various processors, a communication interface (not illustrated) for communicating with each portion, and a storage medium 4*a* such as a hard disk, a solid state drive (SSD), or a read only memory (ROM) and generally controls the first projection portion 1*a* and the second projection portion 1*b*, and the operation reception portion 2.

Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be composed of one of the various processors or may be composed of a combination of two or more processors of the same type or different types (for example, a combination of a plurality of FPGAs or a combination of a CPU and an FPGA).

The operation reception portion 2 detects an instruction (user instruction) from a user by receiving various operations from the user. The operation reception portion 2 may be a button, a key, a joystick, or the like provided in the control device 4 or a reception portion or the like that receives a signal from a remote controller for remotely operating the control device 4.

The first projection portion 1*a*, the second projection portion 1*b*, the control device 4, and the operation reception portion 2 are implemented by, for example, one device. Alternatively, the first projection portion 1*a*, the second projection portion 1*b*, the control device 4, and the operation reception portion 2 may be implemented by a plurality of devices that cooperate by communicating with each other.

The screen 6 is a projection object having a projection surface on which a projection image is displayed by the first projection portion 1*a* and the second projection portion 1*b*. In the example illustrated in FIG. 1, the projection surface of the screen 6 is rectangular. Upper, lower, left, and right sides of the screen 6 in FIG. 1 are upper, lower, left, and right sides of the actual screen 6.

A first projection range 7*a* illustrated by a dot dashed line is a region irradiated with projection light by the first projection portion 1*a*. A second projection range 7*b* illustrated by a broken dashed line is a region irradiated with the projection light by the second projection portion 1*b*. In the example illustrated in FIG. 1, each of the first projection range 7*a* and the second projection range 7*b* is rectangular.

For example, the projection system 10 displays a laterally long image on the screen 6 by projecting a divided image to the first projection range 7*a* from the first projection portion 1*a*, projecting a divided image to the second projection range 7*b* from the second projection portion 1*b*, and connecting the two divided images.

In addition, the projection system 10 performs the projection by making the first projection range 7*a* and the second projection range 7*b* partially overlap. In the example illustrated in FIG. 1, an overlapping region 8*a* illustrated by diagonal lines is a region in which the first projection range 7*a* overlaps with the second projection range 7*b*. In the overlapping region 8*a*, each projection image of the first projection range 7*a* and the second projection range 7*b* is displayed with brightness thereof added to each other. Thus, projection results in weird image display.

Regarding this point, the projection system 10 performs overlapping processing such as setting ranges overlapping with each other in advance in the first projection range 7*a* and the second projection range 7*b* and decreasing brightness. As an example, the projection system 10 performs the overlapping processing of decreasing brightness by half on each of a first range of the first projection range 7*a* set as an overlapping region with the second projection range 7*b* and a second range of the second projection range 7*b* set as an overlapping region with the first projection range 7*a*.

In addition, as described above, in a case of displaying the laterally long image by connecting the first projection range 7*a* and the second projection range 7*b* as the two divided images, the projection system 10 performs the overlapping processing of generating the two divided images such that the overlapping region of each of the first projection range 7*a* and the second projection range 7*b* is the same image.

The projection system 10 adjusts a relative position between the first projection range 7*a* and the second projection range 7*b* such that the first range of the first projection range 7*a* and the second range of the second projection range 7*b* accurately overlap with each other, in accordance with the instruction or the like from the user. Accordingly, the weirdness in the overlapping region 8a can be suppressed. According to the present invention, the relative position between the first projection range 7a and the second projection range 7b can be efficiently adjusted.

The relative position between the first projection range 7a and the second projection range 7b is a position of the second projection range 7b relative to the first projection range 7a.

<Internal Configuration of First Projection Portion 1a and Second Projection Portion 1b Illustrated in FIG. 1>

Figure 2:
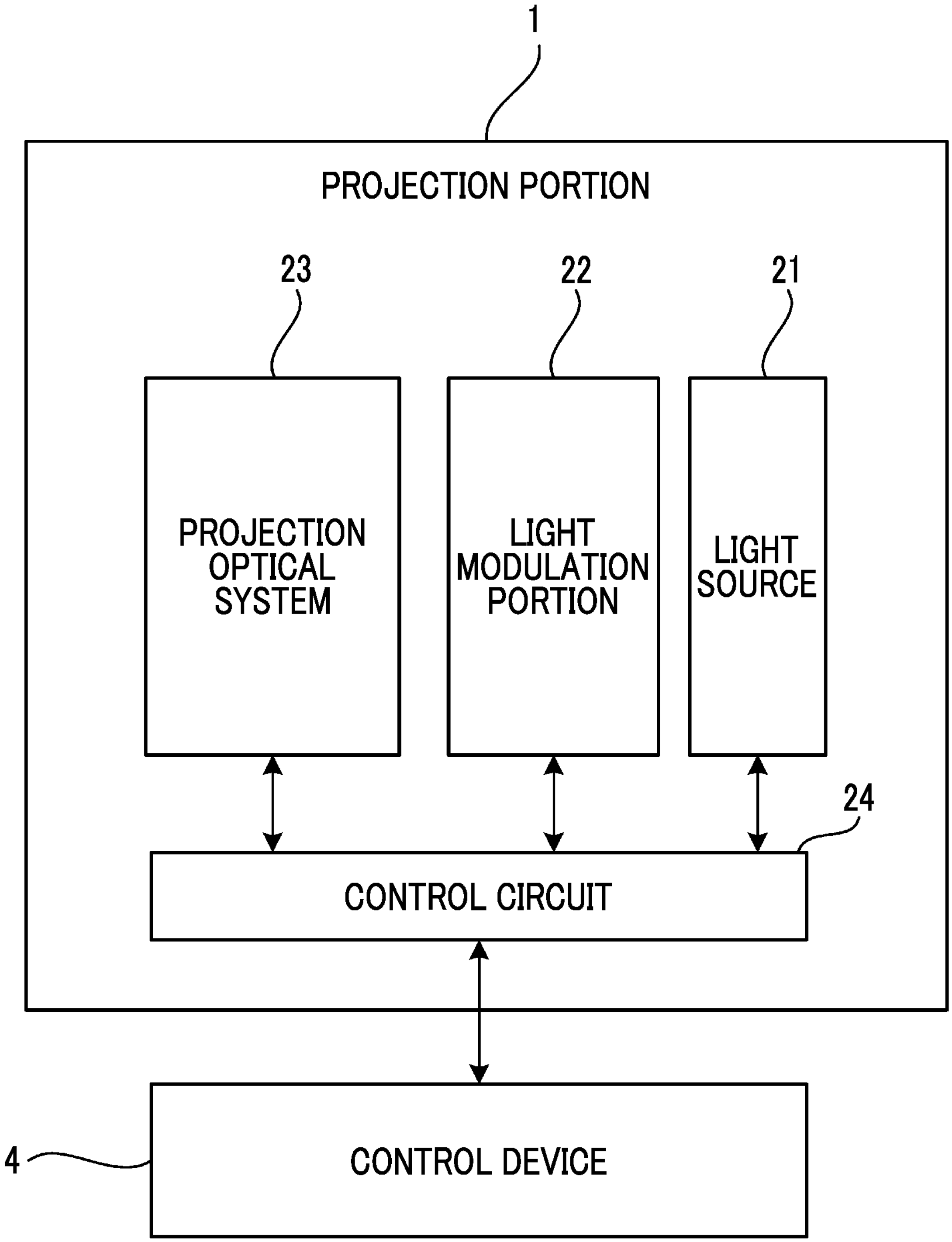
FIG. 2 is a schematic diagram illustrating an example of an internal configuration of a first projection portion 1*a* and a second projection portion 1*b* illustrated in FIG. 1.

FIG. 2 is a schematic diagram illustrating an example of an internal configuration of the first projection portion 1a and the second projection portion 1b illustrated in FIG. 1.

For example, each of the first projection portion 1a and the second projection portion 1b illustrated in FIG. 1 can be implemented by a projection portion 1 illustrated in FIG. 2. The projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is composed of three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is composed of, for example, a relay optical system. The light that has passed through the projection optical system 23 is projected to the screen 6.

The control circuit 24 projects an image based on display data to the screen 6 by controlling the light source 21, the light modulation portion 22, and the projection optical system 23 based on the display data input from the control device 4. The display data input into the control circuit 24 is composed of three constituents of red display data, blue display data, and green display data.

In addition, the control circuit 24 enlarges or reduces a projection range of the projection portion 1 by changing the projection optical system 23 based on an instruction input from the control device 4. In addition, the control device 4 may move the projection range of the projection portion 1 by changing the projection optical system 23 based on the operation received by the operation reception portion 2 from the user.

In addition, the projection system 10 comprises a shift mechanism that mechanically or optically moves the projection range while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection range by changing a range through which the light is transmitted in the light modulation portion 22.

In addition, the projection system 10 may comprise a projection direction changing mechanism that moves the image circle of the projection optical system 23 and the projection range. The projection direction changing mechanism is a mechanism that changes a projection direction of the projection portion 1 by changing a direction of the projection portion 1 by mechanical rotation (for example, refer to FIG. 3 and FIG. 4).

For example, the relative position between the first projection range 7a and the second projection range 7b can be adjusted by moving at least any of the first projection range 7a or the second projection range 7b using the shift mechanism or the projection direction changing mechanism.

<Mechanical Configuration of Projection Portion 1>

Figure 3:
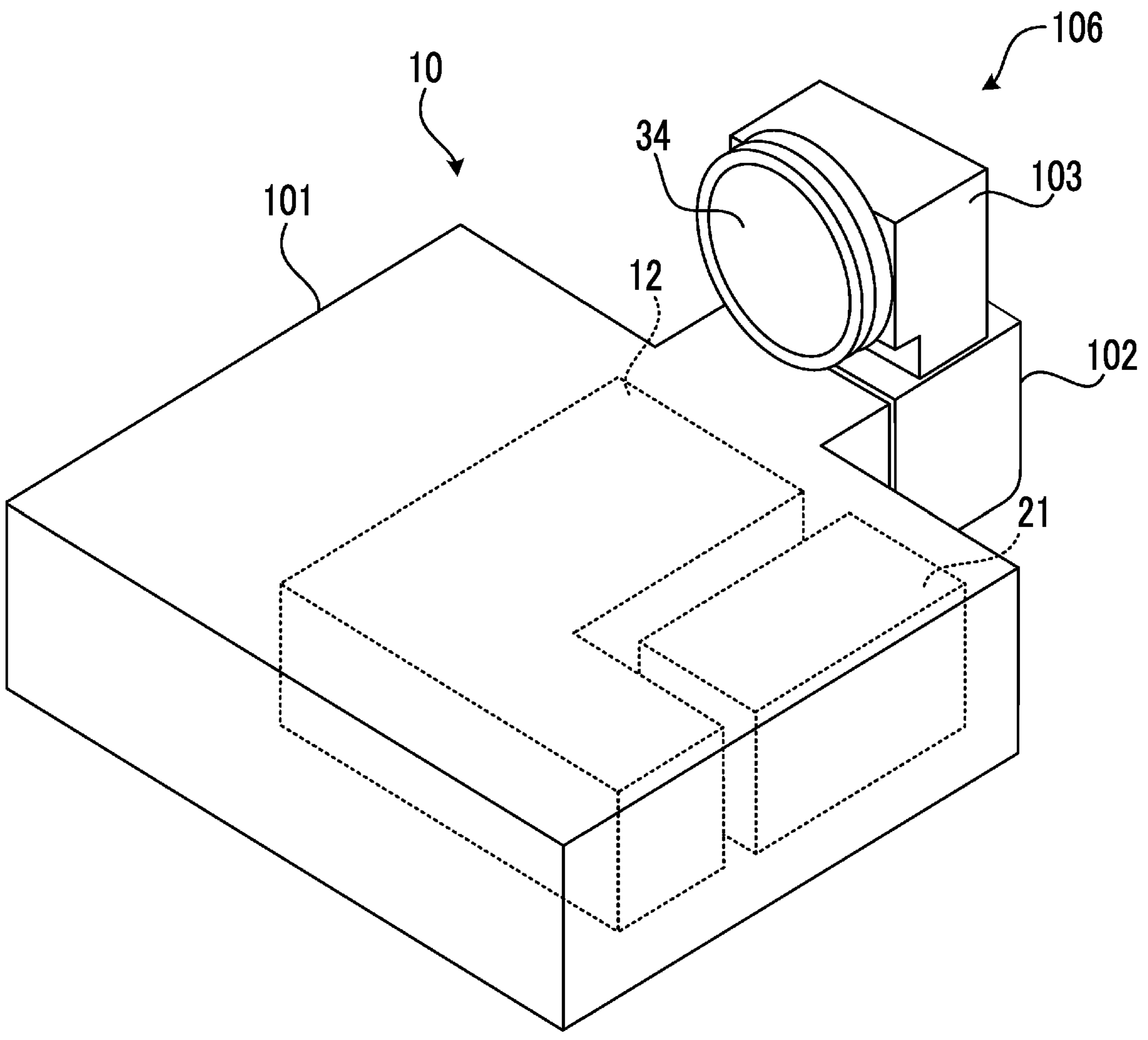
FIG. 3 is a schematic diagram illustrating an exterior configuration of a projection portion 1.
Figure 4:
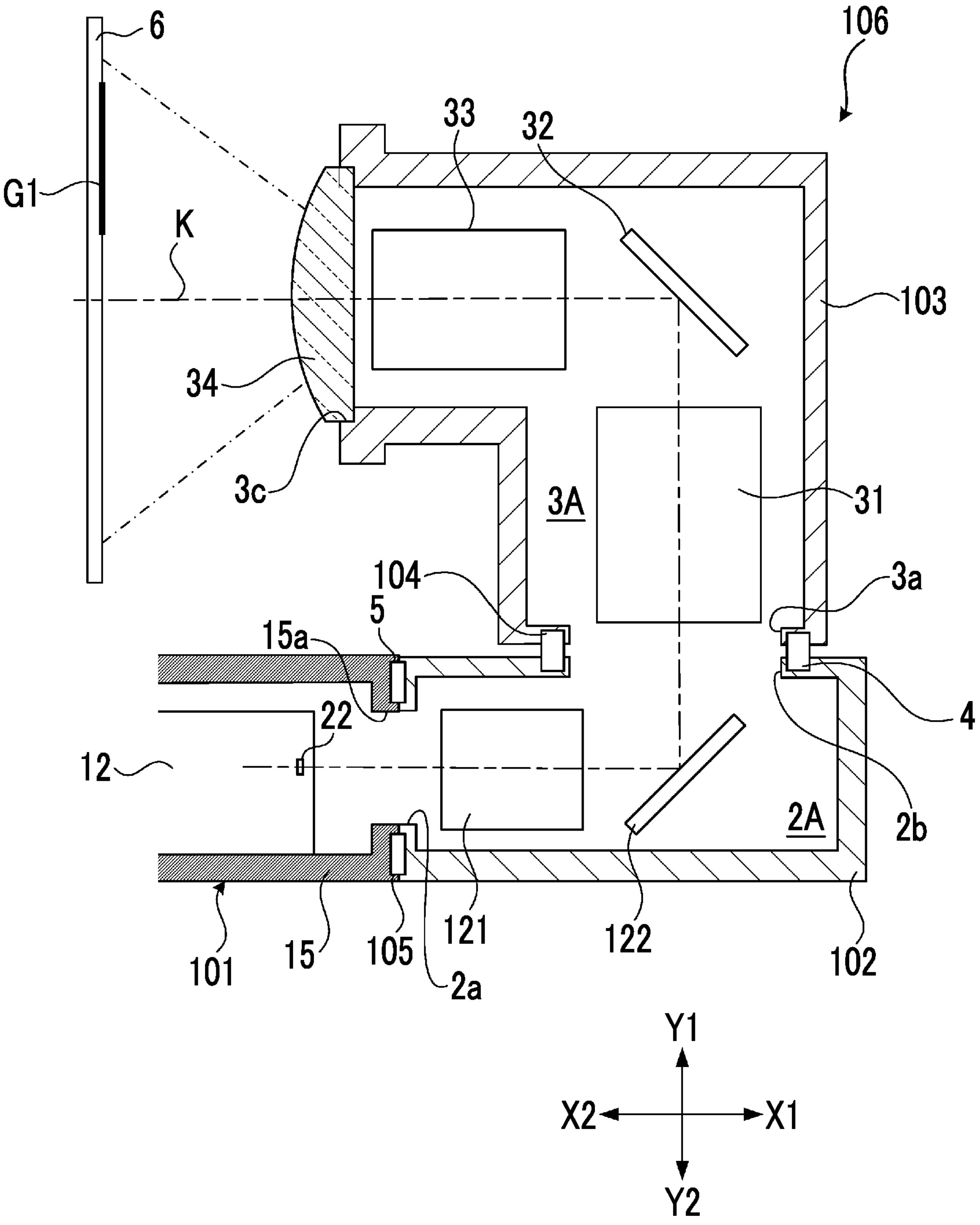
FIG. 4 is a schematic cross-sectional view of an optical unit 106 of the projection portion 1 illustrated in FIG. 3.

FIG. 3 is a schematic diagram illustrating an exterior configuration of the projection portion 1. FIG. 4 is a schematic cross-sectional view of an optical unit 106 of the projection portion 1 illustrated in FIG. 3. FIG. 4 illustrates a cross section in a plane along an optical path of the light emitted from a body part 101 illustrated in FIG. 3.

As illustrated in FIG. 3, the projection portion 1 comprises the body part 101 and the optical unit 106 that is provided to protrude from the body part 101. In the configuration illustrated in FIG. 3, the light source 21, the light modulation portion 22, and the control circuit 24 in the projection portion 1 illustrated in FIG. 2 are provided in the body part 101. The projection optical system 23 in the projection portion 1 is provided in the optical unit 106.

In a case of implementing each of the first projection portion 1a and the second projection portion 1b by the projection portion 1, the operation reception portion 2 and the control device 4 may be configured as a part of any of two projection portions 1 constituting the first projection portion 1a and the second projection portion 1b or may be configured as a configuration separated from the two projection portions 1 constituting the first projection portion 1a and the second projection portion 1b.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 through the opening 15*a* of the housing 15 and is projected to the screen 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a shift mechanism 105, and a projection direction changing mechanism 104.

The first member 102 is a member having, for example, a rectangular cross-sectional exterior, in which an opening 2*a* and an opening 2*b* are formed in surfaces perpendicular to each other. The first member 102 is supported by the body part 101 in a state where the opening 2*a* is arranged at a position facing the opening 15*a* of the body part 101. The light emitted from the light modulation portion 22 of the light modulation unit 12 of the body part 101 is incident into the hollow portion 2A of the first member 102 through the opening 15*a* and the opening 2*a*.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection system 10 is arranged such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and travels in the direction X1, to the reflective member 122.

The reflective member 122 reflects the light incident from the first optical system 121 in the direction Y1. The reflective member 122 is composed of, for example, a mirror. In the first member 102, the opening 2*b* is formed on the optical path of the light reflected by the reflective member 122, and the reflected light travels to the hollow portion 3A of the second member 103 by passing through the opening 2*b*.

The second member 103 is a member having an approximately T-shaped cross-sectional exterior, in which an opening 3*a* is formed at a position facing the opening 2*b* of the first member 102. The light that has passed through the opening 2*b* of the first member 102 from the body part 101 is incident into the hollow portion 3A of the second member 103 through the opening 3*a*. The first member 102 and the second member 103 may have any cross-sectional exterior and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is composed of, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3*c* formed in this end part. The lens 34 projects the light incident from the third optical system 33 to the screen 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 by the shift mechanism 105 from the state illustrated in FIG. 4, a relative position between a center of the image (in other words, a center of a display surface) formed by the light modulation portion 22 and the optical axis K changes, and the image G1 projected to the screen 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the screen 6 can be moved in the direction Y2.

<State Before Adjustment of Relative Position Between First Projection Range 7*a* and Second Projection Range 7*b*>

Figure 5:
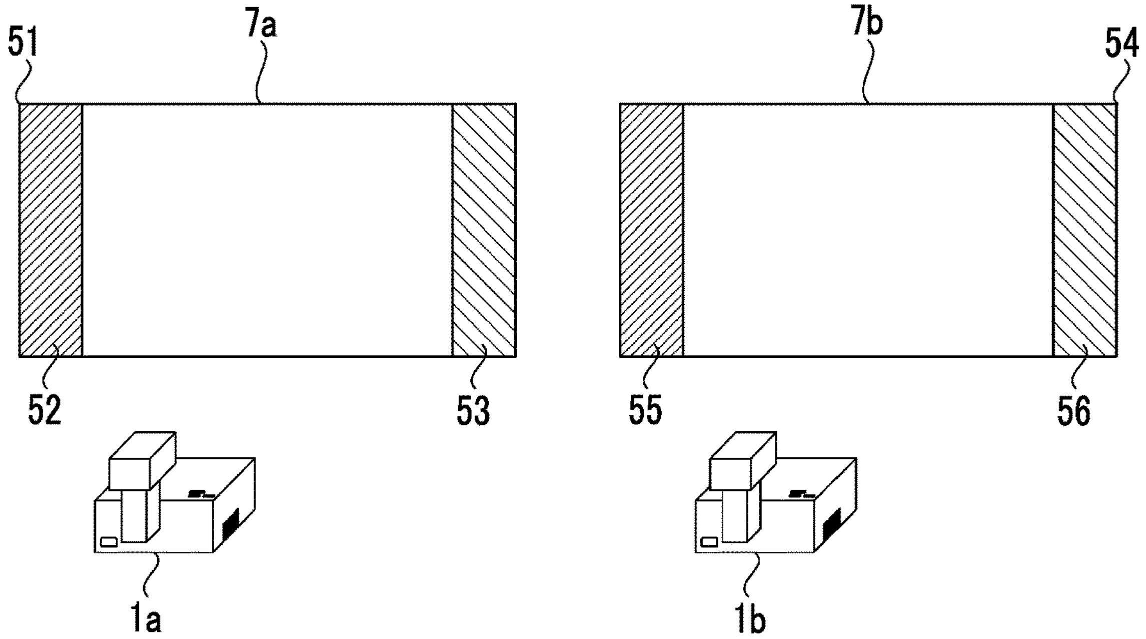
FIG. 5 is a diagram illustrating an example of a state before adjustment of a relative position between a first projection range 7*a* and a second projection range 7*b*.

FIG. 5 is a diagram illustrating an example of a state before the adjustment of the relative position between the first projection range 7*a* and the second projection range 7*b*.

In the example illustrated in FIG. 5, the first projection portion 1*a* is arranged on a left side toward the screen 6, and the second projection portion 1*b* is arranged on a right side toward the screen 6 as in the example illustrated in FIG. 1. The first projection range 7*a* of the first projection portion 1*a* is arranged on a left side of the second projection range 7*b* of the second projection portion 1*b*. However, in the state illustrated in FIG. 5, the relative position between the first projection range 7*a* and the second projection range 7*b* is not adjusted yet.

For example, the control device 4 has a coarse adjustment mode in which the relative position between the first projection range 7*a* and the second projection range 7*b* is coarsely adjusted, and a fine adjustment mode in which the relative position between the first projection range 7*a* and the second projection range 7*b* is finely adjusted. The fine adjustment is adjustment (more detailed adjustment) having a smaller displacement amount than the coarse adjustment. The coarse adjustment constitutes first adjustment, and the fine adjustment constitutes second adjustment.

In a state of adjusting the relative position between the first projection range 7*a* and the second projection range 7*b*, first, the control device 4 is set to the coarse adjustment mode. In the coarse adjustment mode, the control device 4 projects a first adjustment image 51 to the first projection range 7*a* from the first projection portion 1*a* and projects a first adjustment image 54 to the second projection range 7*b* from the second projection portion 1*b*.

The first adjustment image 51 is an image in which an end part 52 on a left side is blue (illustrated by upper right to lower left diagonal lines), and an end part 53 on a right side is yellow (illustrated by upper left to lower right diagonal lines) that is a complementary color to blue, and is an image in which a color (for example, white) between the end part 52 and the end part 53 is different from blue and yellow. The first adjustment image 54 is an image in which an end part 55 on a left side is blue, an end part 56 on a right side is yellow, and a color (for example, white) between the end part 55 and the end part 56 is different from blue and yellow, like the first adjustment image 51. Blue constitutes a first color, and yellow constitutes a second color.

A range of the first projection range 7*a* to which the end part 52 is projected constitutes the first range to overlap with the second projection range 7*b*. A range of the second projection range 7*b* to which the end part 55 is projected constitutes the second range to overlap with the first projection range 7*a*. The adjustment of the relative position between the first projection range 7*a* and the second projection range 7*b* is adjustment of making the first range of the first projection range 7*a* to which the end part 52 is projected, overlap with the second range of the second projection range 7*b* to which the end part 55 is projected.

<Adjustment of Each Projection Range in Coarse Adjustment Mode>

Figure 6:
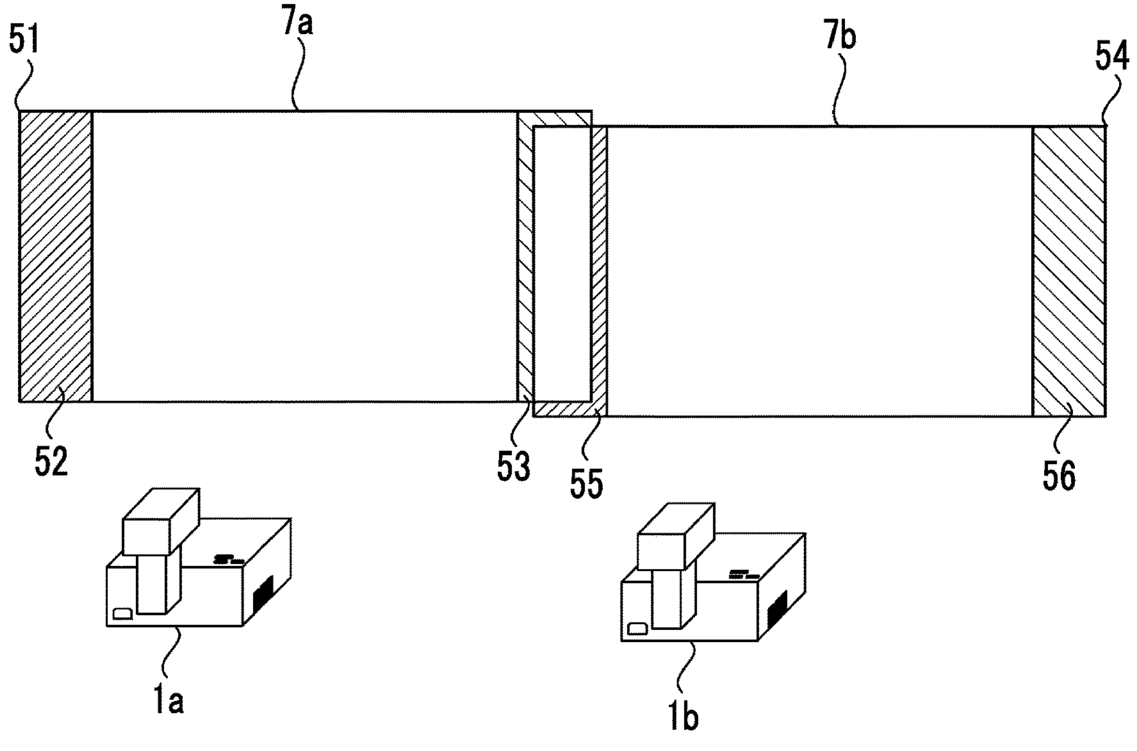
FIG. 6 is a diagram illustrating an example of adjustment of each projection range in a coarse adjustment mode.

FIG. 6 is a diagram illustrating an example of adjustment of each projection range in the coarse adjustment mode.

In the state illustrated in FIG. 5, the user adjusts the relative position between the first projection range 7*a* and the second projection range 7*b* by moving at least any of the first projection range 7*a* or the second projection range 7*b*. Here, it is assumed that the user moves the second projection range 7*b* of the second projection portion 1*b*.

For example, the movement of the second projection range 7*b* in the coarse adjustment mode is implemented by causing the control device 4 to move the second projection range 7*b* using the shift mechanism or the projection direction changing mechanism in accordance with the instruction from the user through the operation reception portion 2. Alternatively, the second projection range 7*b* may be moved by causing the user to manually move or rotate the second projection portion 1*b*.

As a result of moving the second projection range 7*b*, it is assumed that the end part 52 of the first adjustment image 51 partially overlaps with the end part 55 of the first adjustment image 54 as illustrated in FIG. 6. Since the end part 52 is blue, and the end part 55 is yellow that is a complementary color to blue, parts that overlap with each other in the end part 52 and the end part 55 have an achromatic color.

Thus, the user further moves the second projection range 7*b* such that the parts having an achromatic color in the end part 52 and the end part 55 are increased, or blue and yellow parts in the end part 52 and the end part 55 are decreased. Accordingly, the coarse adjustment of making the first range (end part 53) of the first projection range 7*a* approximately overlap with the second range (end part 55) of the second projection range 7*b* can be performed.

Here, the end part 53 of the first adjustment image 51 and the end part 55 of the first adjustment image 54 are images having a relatively low first spatial frequency. A spatial frequency is fineness of an image and is, for example, the number of shades (brightness) or colors included per unit distance. For example, each of the end parts 53 and 55 is an image of a spatial frequency of 0 that has no change in brightness and color in a vertical direction and a lateral direction.

In the coarse adjustment mode, the control device 4 projects the first adjustment images 51 and 54 having the end parts 53 and 55 having the relatively low first spatial frequency from the first projection portion 1*a* and the second projection portion 1*b*. Accordingly, since the end parts 53 and 55 to overlap with each other are easily visible to the user, the user can easily perform the coarse adjustment of the relative position between the first projection range 7*a* and the second projection range 7*b*.

<Switching from Coarse Adjustment Mode to Fine Adjustment Mode>

Figure 7:
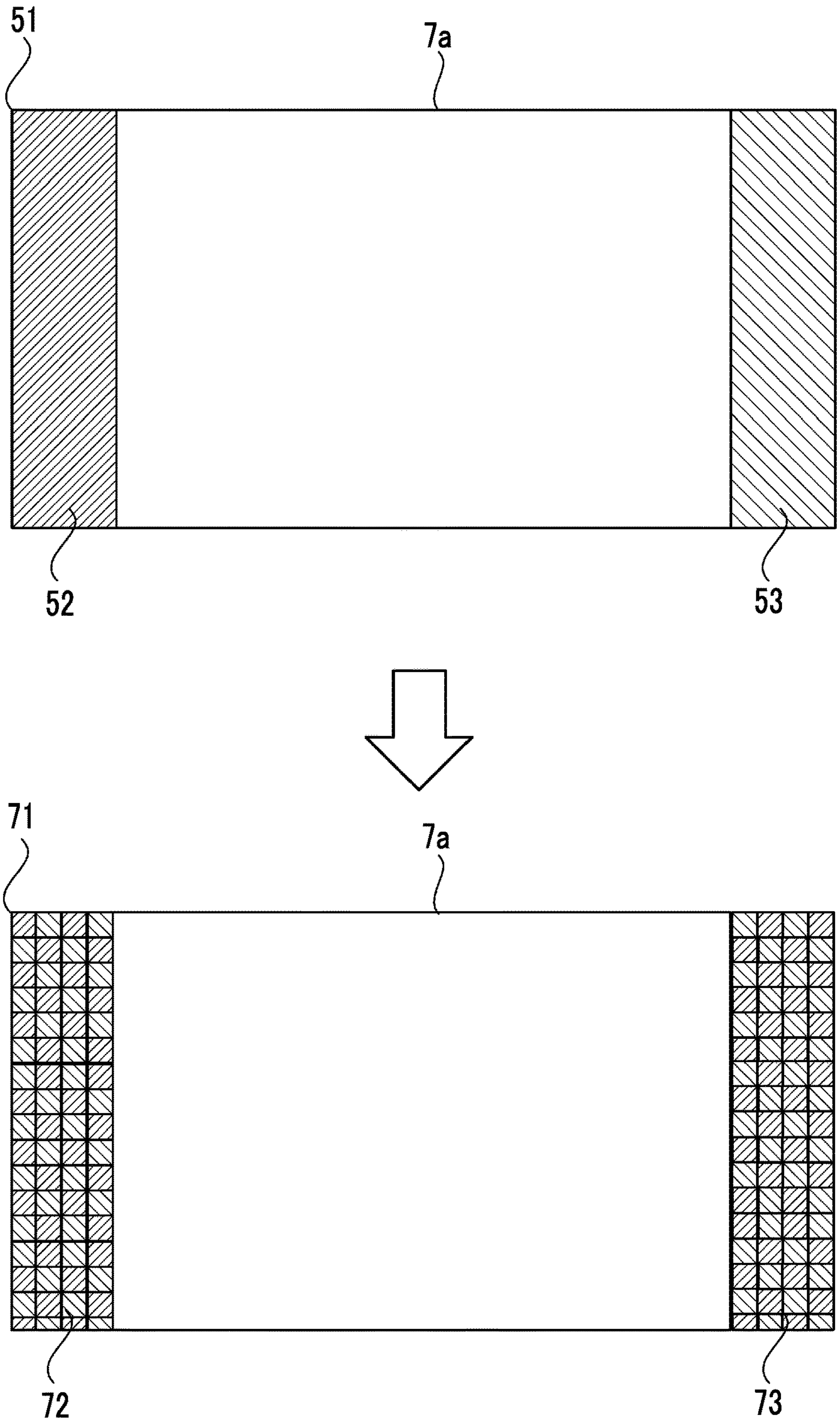
FIG. 7 is a diagram (Part 1) illustrating an example of switching from the coarse adjustment mode to a fine adjustment mode.
Figure 8:
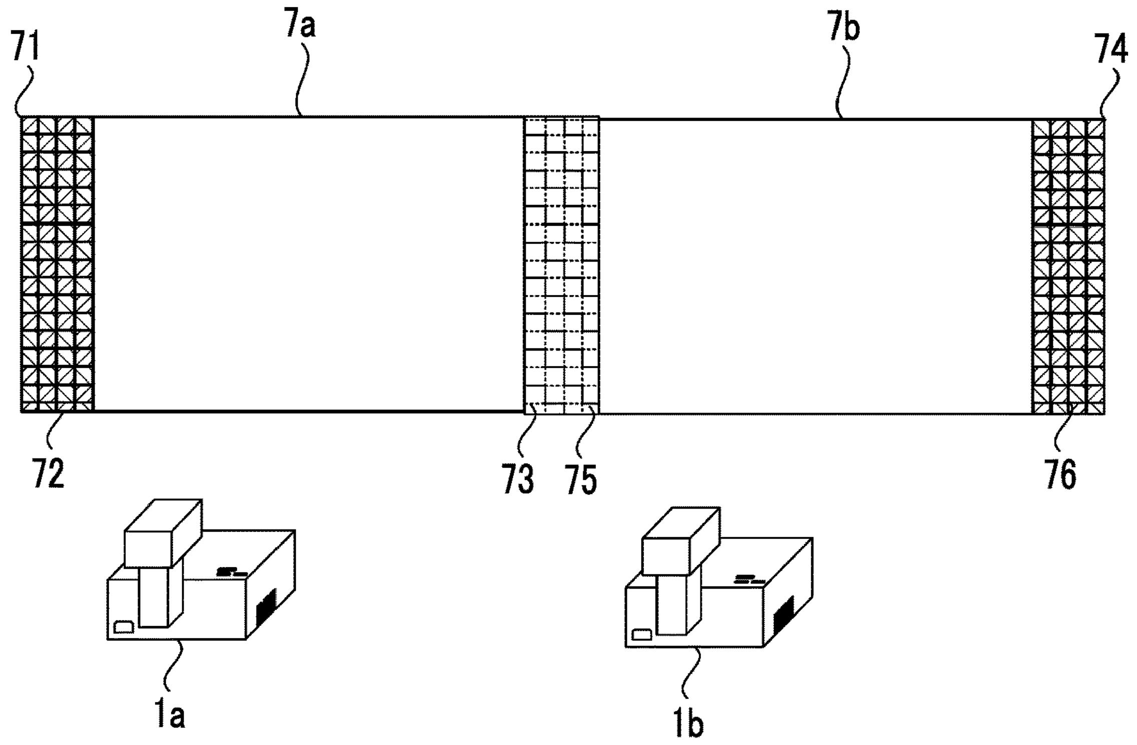
FIG. 8 is a diagram (Part 2) illustrating an example of the switching from the coarse adjustment mode to the fine adjustment mode.
Figure 9:
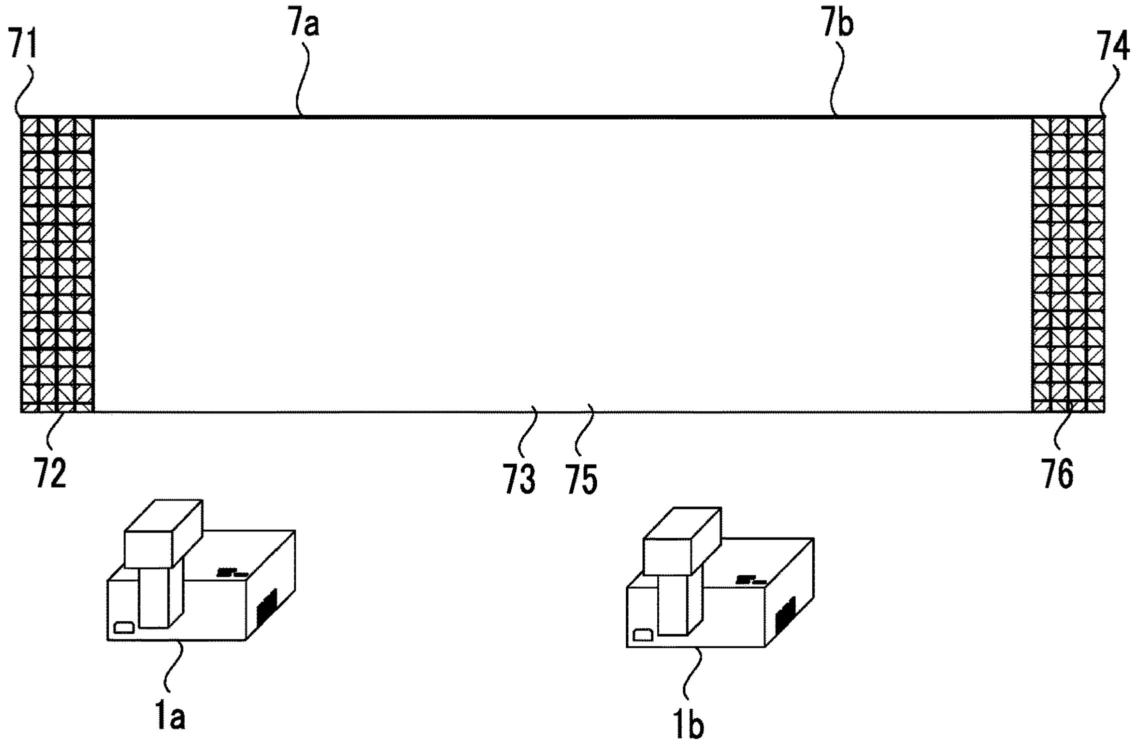
FIG. 9 is a diagram (Part 3) illustrating an example of the switching from the coarse adjustment mode to the fine adjustment mode.

FIG. 7 to FIG. 9 are diagrams illustrating an example of switching from the coarse adjustment mode to the fine adjustment mode.

The control device 4 switches from the coarse adjustment mode to the fine adjustment mode in accordance with the instruction from the user through the operation reception portion 2. For example, in a case where the coarse adjustment based on the coarse adjustment mode illustrated in FIG. 6 is finished, the user instructs the control device 4 to switch to the fine adjustment mode.

As illustrated in FIG. 7 and FIG. 8, in the fine adjustment mode, the control device 4 projects a second adjustment image 71 to the first projection range 7*a* from the first projection portion 1*a* and projects a second adjustment image 74 to the second projection range 7*b* from the second projection portion 1*b*.

As illustrated in FIG. 7, in the second adjustment image 71, an end part 72 on a left side is an image of a first pattern, an end part 73 on a right side is an image of a second pattern, and an image (for example, a white image) between the end part 72 and the end part 73 is different from each image of the first pattern and the second pattern.

For example, the first pattern is a lattice pattern in which blue squares and yellow squares are alternately arranged in two dimensions. For example, the second pattern is a lattice pattern in which blue squares and yellow squares are alternately arranged in two dimensions, and is a pattern in which blue and yellow are inverted with respect to the first pattern.

In the second adjustment image 74, as in the second adjustment image 71, an end part 75 on a left side is an image of the first pattern, an end part 76 on a right side is an image of the second pattern, and an image (for example, a white image) between the end part 75 and the end part 76 is different from each image of the first pattern and the second pattern.

In the fine adjustment mode, the control device 4 performs a control of projecting the second adjustment image 71 in which a part projected to the first range of the first projection range 7*a* is the image of the first pattern, from the first projection portion 1*a* and projecting the second adjustment image 74 in which a part projected to the second range of the second projection range 7*b* is the image of the second pattern, from the second projection portion 1*b*.

The image of the first pattern and the image of the second pattern are images in which a pattern of an overlapping image between the image of the first pattern and the image of the second pattern disappears as illustrated in FIG. 9 in a case where the first range of the first projection range 7*a* and the second range of the second projection range 7*b* are matched.

However, this disappearance of the pattern is not limited to complete disappearance of the pattern and includes local disappearance of the pattern or fading of the pattern. For example, a part in which the pattern of the overlapping image locally disappears may occur because of an external cause such as ambient light at a time of projection that causes brightness unevenness or color unevenness (that is, a complementary color relationship is broken) in a projection image projected to the first projection range 7*a* of the first projection portion 1*a* and a projection image projected to the second projection range 7*b* of the second projection portion 1*b*. Alternatively, a part in which the pattern of the overlapping image locally does not disappear may occur because of an individual difference or the like in optical characteristic between the projection optical systems 23 of the first projection portion 1*a* and the second projection portion 1*b* constituting the projection system (for example, even in a case where lens shifting is performed, calibration in units of pixels cannot be performed). This case (a level at which it is difficult to further perform the calibration) also means the same as the image in which the pattern of the overlapping image disappears.

The user adjusts the relative position between the first projection range 7*a* and the second projection range 7*b* by moving at least any of the first projection range 7*a* or the second projection range 7*b* in a direction in which the pattern of the overlapping image between the image of the first pattern and the image of the second pattern disappears, or such that vertical lines and lateral lines of the overlapping image are thinned. Here, it is assumed that the user moves the second projection range 7*b* of the second projection portion 1*b*.

For example, the movement of the second projection range 7*b* in the fine adjustment mode is implemented by causing the control device 4 to move the second projection range 7*b* using the shift mechanism or the projection direction changing mechanism in accordance with the instruction from the user through the operation reception portion 2.

In the example illustrated in FIG. 8, the second range (end part 75) of the second projection range 7*b* slightly deviates in a lower left direction from the first range (end part 73) of the first projection range 7*a*, and vertical lines and lateral lines in a lattice form are displayed in an overlapping region between the end parts 73 and 75. Among the vertical lines and the lateral lines, solid lines illustrate a blue part, and a broken line illustrates a yellow part for convenience of illustration.

In a case where the second range (end part 75) of the second projection range 7*b* deviates only in the vertical direction from the first range (end part 73) of the first projection range 7*a*, only the lateral lines among the vertical lines and the lateral lines in the lattice form illustrated in FIG. 8 are displayed in the overlapping region between the end parts 73 and 75. In a case where the second range (end part 75) of the second projection range 7*b* deviates only in the lateral direction from the first range (end part 73) of the first projection range 7*a*, only the vertical lines among the vertical lines and the lateral lines in the lattice form illustrated in FIG. 8 are displayed in the overlapping region between the end parts 73 and 75.

The user moves the second projection range 7*b* in the direction in which the pattern of the overlapping image between the image of the first pattern and the image of the second pattern disappears, or such that the vertical lines and the lateral lines of the overlapping image are thinned. Accordingly, as illustrated in FIG. 9, the fine adjustment of making the first range (end part 73) of the first projection range 7*a* accurately overlap with the second range (end part 75) of the second projection range 7*b* can be performed.

Here, the end part 73 of the second adjustment image 71 and the end part 75 of the second adjustment image 74 are images having a second spatial frequency higher than the first spatial frequency. For example, each of the end parts 73 and 75 is an image of a high spatial frequency in which color changes for each lattice.

In the fine adjustment mode, the control device 4 projects the second adjustment images 71 and 74 having the end parts 73 and 75 having the second spatial frequency higher than in the coarse adjustment mode from the first projection portion 1*a* and the second projection portion 1*b*. Accordingly, since the user easily recognizes minute misregistration between the end parts 73 and 75 to overlap with each other, the user can easily perform the fine adjustment of the relative position between the first projection range 7*a* and the second projection range 7*b*.

As illustrated in FIG. 5 to FIG. 9, the control device 4 performs a control of projecting the first adjustment images 51 and 54 and the second adjustment images 71 and 74 different from the first adjustment images 51 and 54 from the first projection portion 1*a* and the second projection portion 1*b* by switching between the first adjustment images 51 and 54 and the second adjustment images 71 and 74. The control device 4 adjusts the relative position between the first projection range 7*a* of the first projection portion 1*a* and the second projection range 7*b* of the second projection portion 1*b* in accordance with the instruction received from the user through the operation reception portion 2.

Specifically, in the coarse adjustment mode, the control device 4 performs a control of projecting the first adjustment image 51 in which the part projected to the first range of the first projection range 7*a* is the image of the first spatial frequency, from the first projection portion 1*a* and projecting the first adjustment image 54 in which the part projected to the second range of the second projection range 7*b* is the image of the first spatial frequency, from the second projection portion 1*b*.

In addition, in the fine adjustment mode, the control device 4 performs a control of projecting the second adjustment image 71 in which the part projected to the first range of the first projection range 7*a* is the image of the second spatial frequency higher than the first spatial frequency, from the first projection portion 1*a* and projecting the second adjustment image 74 in which the part projected to the second range of the second projection range 7*b* is the image of the second spatial frequency, from the second projection portion 1*b*.

Accordingly, stepwise adjustment from the coarse adjustment to the fine adjustment can be performed, and the relative position between the first projection range 7*a* and the second projection range 7*b* can be efficiently adjusted.

<Guide Information Displayed by Control Device 4>

Figure 10:
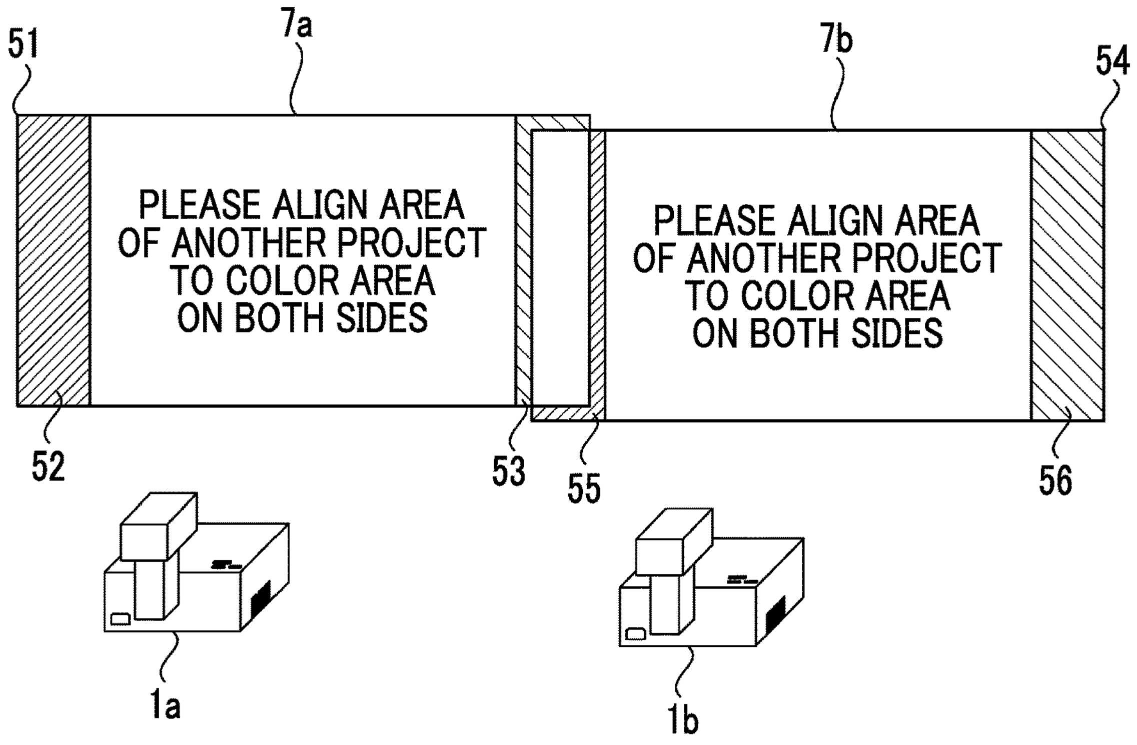
FIG. 10 is a diagram (Part 1) illustrating an example of guide information displayed by a control device 4.
Figure 11:
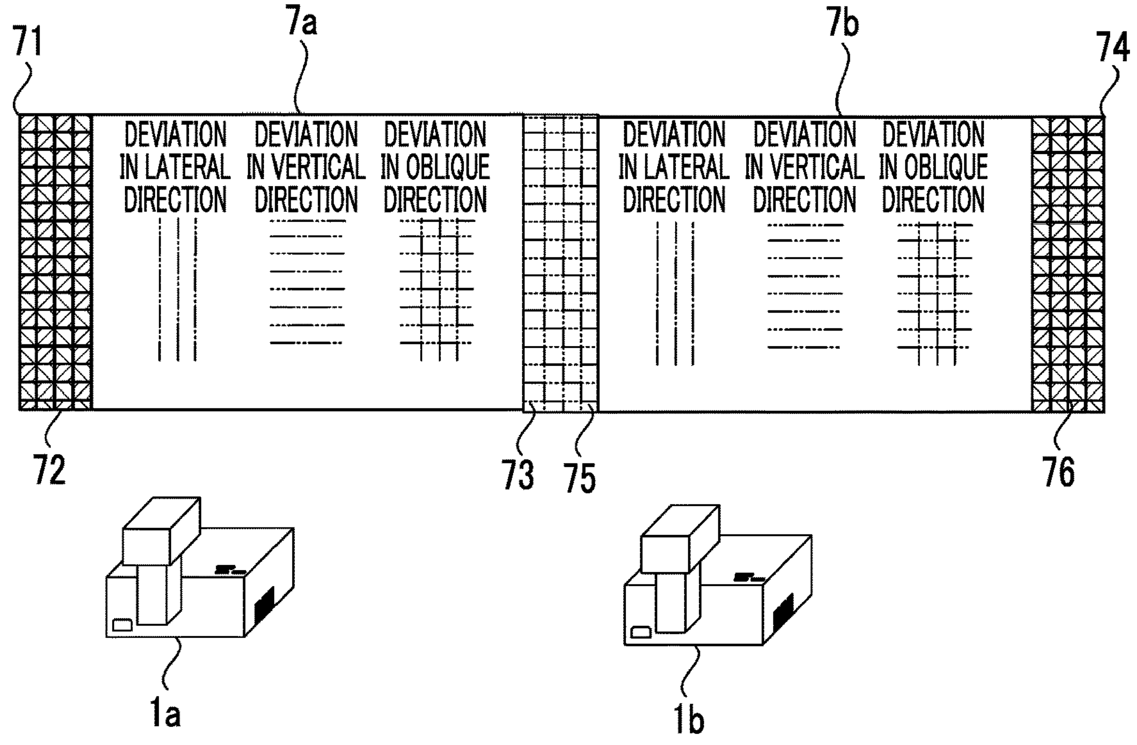
FIG. 11 is a diagram (Part 2) illustrating an example of the guide information displayed by the control device 4.

FIG. 10 and FIG. 11 are diagrams illustrating an example of guide information displayed by the control device 4.

In the coarse adjustment mode, the control device 4 may perform a control of displaying the guide information as a guide for a method of adjusting the relative position between the first projection range 7*a* and the second projection range 7*b* by referring to the first adjustment images 51 and 54. In the fine adjustment mode, the control device 4 may perform a control of displaying the guide information as a guide for a method of adjusting the relative position between the first projection range 7*a* and the second projection range 7*b* by referring to the second adjustment images 71 and 74.

For example, as illustrated in FIG. 10, in the coarse adjustment mode, the control device 4 performs a control of displaying text information "please align area of another projector to color area on both sides" as the guide information as the guide for the method of adjusting the relative position between the first projection range 7*a* and the second projection range 7*b* by referring to the first adjustment images 51 and 54, by including the text information in each of the first adjustment images 51 and 54.

The control device 4 may include the guide information of the coarse adjustment mode in any of the first adjustment images 51 and 54 or may include the guide information of the coarse adjustment mode over the first adjustment images 51 and 54. In addition, the control device 4 may perform a control of displaying the guide information of the coarse adjustment mode on a display or the like comprised in the projection system 10.

In addition, as illustrated in FIG. 11, in the fine adjustment mode, the control device 4 performs a control of displaying an image indicating appearance of a pattern of the overlapping region between the end part 73 and the end part 75 for deviation in each of the lateral direction, the vertical direction, and an oblique direction as the guide information as the guide for the method of adjusting the relative position between the first projection range 7*a* and the second projection range 7*b* by referring to the second adjustment images 71 and 74, by including the image in the second adjustment images 71 and 74.

The control device 4 may include the guide information of the fine adjustment mode in any of the second adjustment images 71 and 74 or may include the guide information of the fine adjustment mode over the second adjustment images 71 and 74. In addition, the control device 4 may perform a control of displaying the guide information of the fine adjustment mode on the display or the like comprised in the projection system 10.

In the fine adjustment mode, furthermore, the control device 4 may perform a control of displaying the text information "please align area of another projector to color area on both sides" illustrated in FIG. 10.

The control device 4 displays the guide information by switching the guide information between the coarse adjustment mode and the fine adjustment mode. Accordingly, the user can easily perceive an adjustment method using an adjustment image in each mode while different adjustment images are displayed in each mode.

<User Interface for User to Provide Instruction to Projection System 10>

Figure 12:
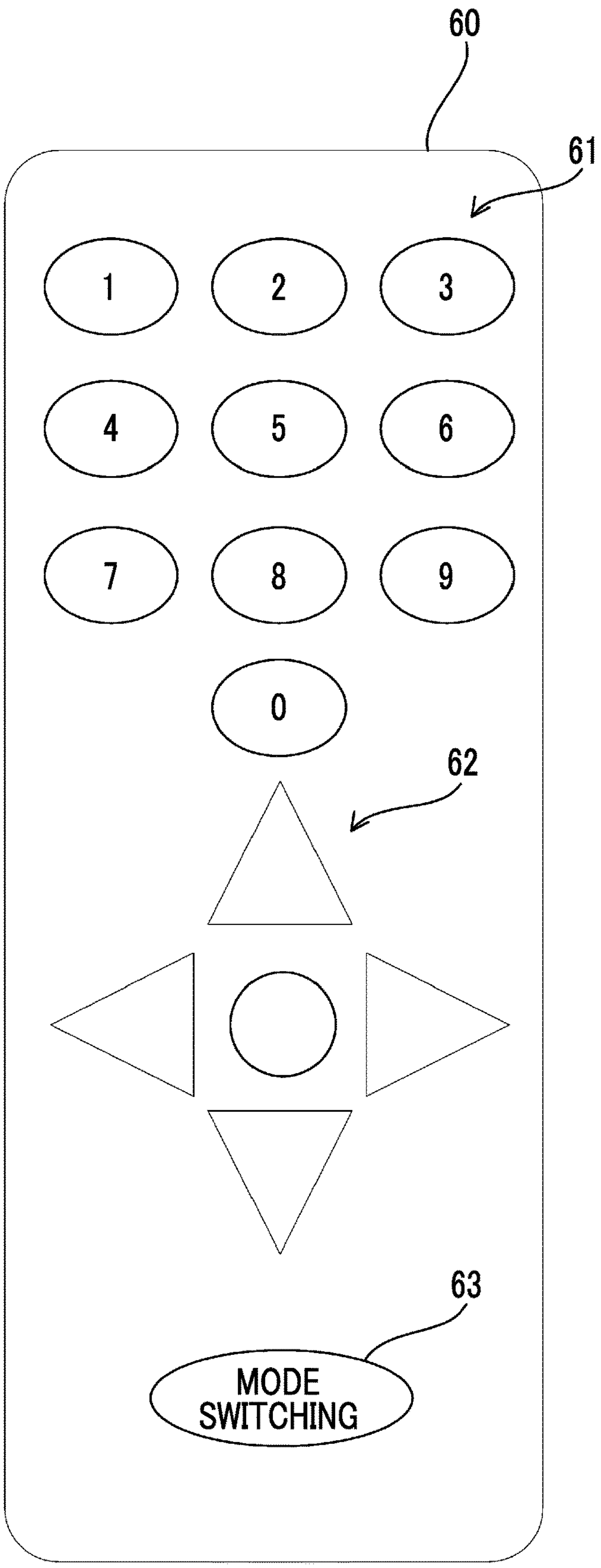
FIG. 12 is a diagram illustrating an example of a user interface for a user to provide an instruction to the projection system 10.

FIG. 12 is a diagram illustrating an example of a user interface for the user to provide an instruction to the projection system 10.

For example, the operation reception portion 2 can be used as a reception portion that receives a signal from a remote controller 60 illustrated in FIG. 12. The remote controller 60 includes a ten key 61, a direction key 62, and a switching key 63.

The ten key 61 is an operating part for numerical value input that consists of 10 keys of "0" to "9". The direction key 62 is an operating part for direction instruction that consists of four keys of upper, lower, left, and right keys. The switching key 63 is a key for switching between the coarse adjustment mode and the fine adjustment mode.

For example, in the coarse adjustment mode and the fine adjustment mode, the control device 4 moves a projection range of a setting target out of the first projection range 7*a* and the second projection range 7*b* in accordance with a push on the direction key 62 using the shift mechanism or the projection direction changing mechanism. In this case, the push on the direction key 62 constitutes a first operation.

The projection range of the setting target out of the first projection range 7*a* and the second projection range 7*b* may be designated by the user by a user operation through the operation reception portion 2 or may be set by the control device 4 based on a number or the like assigned to the first projection portion 1*a* and the second projection portion 1*b*.

In addition, in the fine adjustment mode, the control device 4 may receive a second operation for correcting distortion of the image caused by projection of at least any of the first projection portion 1*a* or the second projection portion 1*b* from the user in addition to the first operation for adjusting the relative position between the first projection range 7*a* and the second projection range 7*b*. For example, this second operation can be a push on the ten key 61.

For example, in the fine adjustment mode, the control device 4 performs distortion correction in a projection portion of a setting target out of the first projection portion 1*a* and the second projection portion 1*b* in accordance with the push on the ten key 61. In this case, the push on the ten key 61 constitutes the first operation. For example, the distortion correction is correction of keystone distortion of the projection image caused by an installation angle of the first projection portion 1*a* or the second projection portion 1*b* with respect to the screen 6 by image processing. For example, four keys of "2", "8", "4", and "6" of the ten key 61 are used as a key for providing an instruction of upper, lower, left, and right parts, respectively, in the distortion correction.

In this example, the direction key 62 constitutes a first operating part for receiving the first operation for adjusting the relative position between the first projection range 7*a* and the second projection range 7*b*. In addition, the ten key 61 constitutes a second operating part for receiving the second operation for performing the distortion correction.

The projection portion of the setting target out of the first projection portion 1*a* and the second projection portion 1*b* may be designated by the user by the user operation through the operation reception portion 2 or may be set by the control device 4 based on the number or the like assigned to the first projection portion 1*a* and the second projection portion 1*b*.

By including the first operating part and the second operating part in the projection system 10, the adjustment of the relative position between the first projection range 7*a* and the second projection range 7*b* and the distortion correction can be performed without switching or the like of the mode. For example, the user can set the projection image close to an ideal state while alternately performing the adjustment of the relative position between the first projection range 7*a* and the second projection range 7*b* and the distortion correction gradually. Thus, the adjustment of the relative position between the first projection range 7*a* and the second projection range 7*b* and the distortion correction can be efficiently performed.

<Guide Information Displayed in Fine Adjustment Mode>

Figure 13:
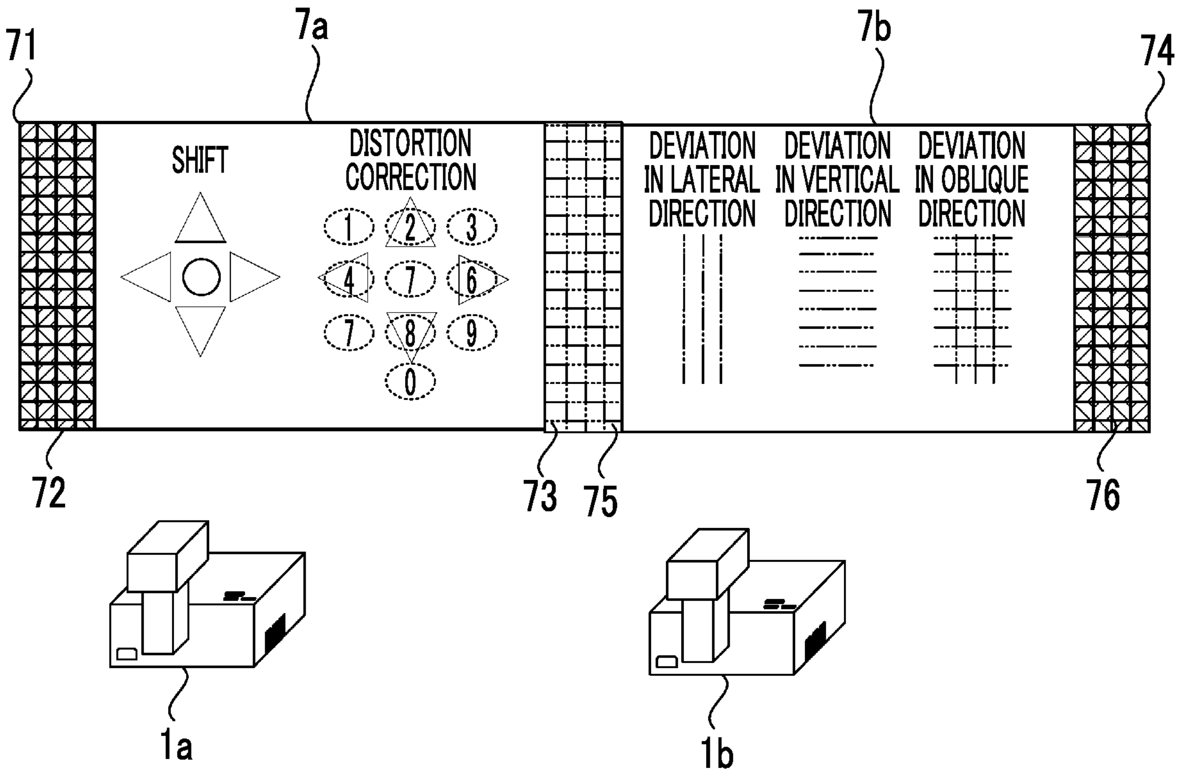
FIG. 13 is a diagram illustrating an example of the guide information displayed in the fine adjustment mode.

FIG. 13 is a diagram illustrating an example of the guide information displayed in the fine adjustment mode.

In the fine adjustment mode, the control device 4 may perform a control of displaying guide information as a guide for a method of the first operation and guide information as a guide for the second operation.

In the example illustrated in FIG. 13, the control device 4 displays an image for a guide indicating that the projection range of the setting target can be moved (shifted) by pushing the direction key 62 as the guide information as the guide for the method of the first operation, by including the image in the second adjustment image 71.

In addition, the control device 4 displays an image for a guide indicating that the distortion correction in the projection portion of the setting target can be performed by pushing "2", "8", "4", and "6" of the ten key 61 as the guide information as the guide for the method of the second operation, by including the image in the second adjustment image 71.

The control device 4 may include the guide information as the guides for the methods of the first operation and the second operation in both of the second adjustment images 71 and 74 or over the second adjustment images 71 and 74. In addition, the control device 4 may perform a control of displaying the guide information on the display or the like comprised in the projection system 10.

<Multiple Uses of Operating Part>

In addition, the ten key 61 constituting the second operating part may be an operating part for providing an instruction for processing different from the adjustment of the relative position between the first projection range 7*a* and the second projection range 7*b* and the distortion correction in the coarse adjustment mode. As an example, in the coarse adjustment mode, the ten key 61 may be an operating part used for inputting various numerical values such as the number of projection portions of an adjustment target. In a case where the control device 4 is switched to the fine adjustment mode, the ten key 61 switches to an operating part for receiving the second operation for performing the distortion correction.

Accordingly, each operation in the coarse adjustment mode and the fine adjustment mode can be implemented by a limited user interface. Similarly, the direction key 62 may be an operating part for providing an instruction for processing different from the adjustment of the relative position between the first projection range 7*a* and the second projection range 7*b* and the distortion correction in the coarse adjustment mode.

In addition, in a case where a change is made from the coarse adjustment mode to the fine adjustment mode, the control device 4 may perform a control of displaying information indicating that a function of an operating part of at least any of the first operating part (for example, the direction key 62) or the second operating part (for example, the ten key 61) is changed. This display of the information may be performed by including the information in at least any of the second adjustment image 71 or 74 or may be performed by the display or the like comprised in the projection system 10.

In addition, even in a case where a change is made from the fine adjustment mode to the coarse adjustment mode, the control device 4 may perform a control of displaying information indicating that a function of an operating part of at least any of the first operating part (for example, the direction key 62) or the second operating part (for example, the ten key 61) is changed. This display of the information may be performed by including the information in at least any of the second adjustment image 71 or 74 or may be performed by the display or the like comprised in the projection system 10.

<Switching of Mode>

For example, in a case where the switching key 63 of the remote controller 60 is pushed in the coarse adjustment mode, the control device 4 switches from the coarse adjustment mode to the fine adjustment mode. In addition, each time the switching key 63 of the remote controller 60 is pushed, the control device 4 may alternately switch between the coarse adjustment mode and the fine adjustment mode. Accordingly, a return can be made from the fine adjustment mode to the coarse adjustment mode. The switching key 63 of the remote controller 60 constitutes an instruction portion that receives the instruction from the user.

Modification Example 1

While a configuration in which the control device 4 switches between the coarse adjustment mode and the fine adjustment mode to project the first adjustment images 51 and 54 and the second adjustment images 71 and 74 by switching between the first adjustment images 51 and 54 and the second adjustment images 71 and 74 is described, the control device 4 may project the first adjustment images 51 and 54 and the second adjustment images 71 and 74 by switching between the first adjustment images 51 and 54 and the second adjustment images 71 and 74 without switching the mode.

Modification Example 2

While blue and yellow are illustrated as a combination of colors complementary to each other, the combination of the colors complementary to each other is not limited thereto and may be, for example, a combination of red and blue-green, yellow and purple, reddish purple and green, aqua and vermilion, and the like.

Modification Example 3

While a configuration in which patterns having the combination of the colors complementary to each other are used in the second adjustment images 71 and 74 is described, the present invention is not limited to such a configuration. For example, the blue part and the yellow part in the second adjustment images 71 and 74 using blue and yellow may be white and black, respectively. In addition, the patterns are not limited to lattice patterns and can be various patterns such as stripe patterns.

Modification Example 4

While a configuration in which the projection system 10 includes two of the first projection portion 1*a* and the second projection portion 1*b* and adjusts the relative position between two of the first projection range 7*a* and the second projection range 7*b* is described, the projection system 10 may be configured to include three or more projection portions and adjust a relative position among three or more projection ranges. For example, it is assumed that the projection system 10 includes a third projection portion in addition to the first projection portion 1*a* and the second projection portion 1*b*. A projection range of the third projection portion is referred to as a third projection range. It is assumed that the third projection range is positioned on a right side of the second projection range 7*b*.

In this case, for example, in the coarse adjustment mode, the control device 4 projects an image for the first adjustment similar to the first adjustment images 51 and 54 to the third projection range from the third projection portion. Accordingly, the coarse adjustment of a relative position between the second projection range 7*b* and the third projection range can be performed by making a range of an end part (blue) on a left side of the image for the first adjustment projected to the third projection range overlap with the end part 56 (yellow) of the first adjustment image 54.

Similarly, in the fine adjustment mode, the control device 4 projects an image for the second adjustment similar to the second adjustment images 71 and 74 to the third projection range from the third projection portion. Accordingly, the fine adjustment of the relative position between the second projection range 7*b* and the third projection range can be performed by making a range of an end part on a left side of the image for the second adjustment projected to the third projection range overlap with the end part 76 of the second adjustment image 74.

At least the following matters are disclosed in the present specification.

(1) A projection system that projects a projection range of a first projection portion and a projection range of a second projection portion in a partially overlapping manner, the projection system including a processor configured to perform a control of projecting a first adjustment image or a second adjustment image different from the first adjustment image from the first projection portion and the second projection portion and execute a control of adjusting a relative position between a first projection range of the first projection portion and a second projection range of the second projection portion in accordance with a received instruction.

(2) The projection system according to (1), in which the processor is configured to execute a control of performing first adjustment on the relative position in a state of projecting the first adjustment image, and performing second adjustment having a smaller displacement amount than the first adjustment on the relative position in a state of projecting the second adjustment image.

(3) The projection system according to (1) or (2), in which the first adjustment image is an image including an image of a first spatial frequency, the second adjustment image is an image including an image of a second spatial frequency higher than the first spatial frequency, and the processor is configured to execute the control of projecting the first adjustment image or the second adjustment image from the first projection portion and the second projection portion.

(4) The projection system according to any one of (1) to (3), in which the adjustment of the relative position is adjustment of making a first range of the first projection range overlap with a second range of the second projection range.

(5) The projection system according to (4), in which the processor is configured to, in a state of projecting the first adjustment image, execute a control of projecting the first adjustment image in which a part projected to the first range is an image of a first spatial frequency from the first projection portion, and projecting the first adjustment image in which a part projected to the second range is the image of the first spatial frequency from the second projection portion, and in a state of projecting the second adjustment image, execute a control of projecting the second adjustment image in which a part projected to the first range is an image of a second spatial frequency higher than the first spatial frequency from the first projection portion, and projecting the second adjustment image in which a part projected to the second range is the image of the second spatial frequency from the second projection portion.

(6) The projection system according to (4) or (5), in which the processor is configured to, in a state of projecting the first adjustment image, execute a control of projecting the first adjustment image in which a part projected to the first range has a first color from the first projection portion, and projecting the first adjustment image in which a part projected to the second range has a second color that is a complementary color to the first color from the second projection portion.

(7) The projection system according to any one of (4) to (6), in which the processor is configured to, in a state of projecting the second adjustment image, execute a control of projecting the second adjustment image in which a part projected to the first range is an image of a first pattern from the first projection portion, and projecting the second adjustment image in which a part projected to the second range is an image of a second pattern from the second projection portion, and the image of the first pattern and the image of the second pattern are images in which a pattern of an overlapping image between the image of the first pattern and the image of the second pattern disappears in a case where the first range and the second range are matched.

(8) The projection system according to any one of (1) to (7), in which the processor is configured to, in a state of projecting the first adjustment image, execute a control of displaying guide information as a guide for a method of adjusting the relative position by referring to the first adjustment image, and in a state of projecting the second adjustment image, execute a control of displaying guide information as a guide for a method of adjusting the relative position by referring to the second adjustment image.

(9) The projection system according to (8), in which the processor is configured to, in a state of projecting the first adjustment image, execute a control of displaying the guide information as the guide for the method of adjusting the relative position by referring to the first adjustment image, by including the guide information in the first adjustment image, and in a state of projecting the second adjustment image, execute a control of displaying the guide information as the guide for the method of adjusting the relative position by referring to the second adjustment image, by including the guide information in the second adjustment image.

(10) The projection system according to any one of (1) to (9), in which the processor is configured to, in a state of projecting the second adjustment image, execute a control of receiving a first operation for adjusting the relative position and a second operation for correcting distortion of an image caused by projection of at least any of the first projection portion or the second projection portion from a user.

(11) The projection system according to (10), in which the processor is configured to, in a state of projecting the second adjustment image, execute a control of displaying guide information as a guide for a method of the first operation and guide information as a guide for a method of the second operation.

(12) The projection system according to (11), in which the processor is configured to, in a state of projecting the second adjustment image, execute a control of displaying the guide information as the guide for the method of the first operation and the guide information as the guide for the method of the second operation, by including the guide information in the second adjustment image.

(13) The projection system according to any one of (10) to (12), further including a first operating part for receiving the first operation and a second operating part for receiving the second operation in a state of projecting the second adjustment image.

(14) The projection system according to (13), in which an operating part of at least any of the first operating part or the second operating part is an operating part for providing an instruction for processing different from the adjustment of the relative position and the correction of the distortion in a state of projecting the first adjustment image.

(15) The projection system according to (14), in which the processor is configured to, in a case where a change is made from a control of projecting the first adjustment image by the first projection portion and the second projection portion to a control of projecting the second adjustment image by the first projection portion and the second projection portion, execute a control of displaying information indicating that a function of at least any of the first operating part or the second operating part is changed.

(16) The projection system according to (15), in which the processor is configured to, in a state of projecting the second adjustment image, execute a control of displaying the information indicating that the function of at least any of the first operating part or the second operating part is changed, by including the information in the second adjustment image.

(17) The projection system according to (14), in which the processor is configured to, in a case where a change is made from a control of projecting the second adjustment image by the first projection portion and the second projection portion to a control of projecting the first adjustment image by the first projection portion and the second projection portion, execute a control of displaying information indicating that a function of at least any of the first operating part or the second operating part is changed.

(18) The projection system according to (17), in which the processor is configured to, in a state of projecting the first adjustment image, execute a control of displaying the information indicating that the function of at least any of the first operating part or the second operating part is changed, by including the information in the first adjustment image.

(19) The projection system according to any one of (1) to (18), further including an instruction portion that receives an instruction from a user, in which the processor is configured to, in accordance with a user instruction received by the instruction portion, execute a control of switching from a control of projecting the first adjustment image by the first projection portion and the second projection portion to a control of projecting the second adjustment image by the first projection portion and the second projection portion, or a control of switching from the control of projecting the second adjustment image by the first projection portion and the second projection portion to the control of projecting the first adjustment image by the first projection portion and the second projection portion.

(20) A projection method by a projection system that projects a projection range of a first projection portion and a projection range of a second projection portion in a partially overlapping manner, the projection method including, by a processor included in the projection system, executing a control of projecting a first adjustment image or a second adjustment image different from the first adjustment image from the first projection portion and the second projection portion and executing a control of adjusting a relative position between a first projection range of the first projection portion and a second projection range of the second projection portion in accordance with a received instruction.

(21) The projection method according to (20), in which the processor executes a control of performing first adjustment on the relative position in a state of projecting the first adjustment image, and performing second adjustment having a smaller displacement amount than the first adjustment on the relative position in a state of projecting the second adjustment image.

(22) The projection method according to (20) or (21), in which the first adjustment image is an image including an image of a first spatial frequency, the second adjustment image is an image including an image of a second spatial frequency higher than the first spatial frequency, and the processor executes the control of projecting the first adjustment image or the second adjustment image from the first projection portion and the second projection portion.

(23) The projection method according to any one of (20) to (22), in which the adjustment of the relative position is adjustment of making a first range of the first projection range overlap with a second range of the second projection range.

(24) The projection method according to (23), in which the processor executes, in a state of projecting the first adjustment image, a control of projecting the first adjustment image in which a part projected to the first range is an image of a first spatial frequency from the first projection portion, and projecting the first adjustment image in which a part projected to the second range is the image of the first spatial frequency from the second projection portion, and in a state of projecting the second adjustment image, a control of projecting the second adjustment image in which a part projected to the first range is an image of a second spatial frequency higher than the first spatial frequency from the first projection portion, and projecting the second adjustment image in which a part projected to the second range is the image of the second spatial frequency from the second projection portion.

(25) The projection method according to (23) or (24), in which the processor executes, in a state of projecting the first adjustment image, a control of projecting the first adjustment image in which a part projected to the first range has a first color from the first projection portion, and projecting the first adjustment image in which a part projected to the second range has a second color that is a complementary color to the first color from the second projection portion.

(26) The projection method according to any one of (23) to (25), in which the processor executes, in a state of projecting the second adjustment image, a control of projecting the second adjustment image in which a part projected to the first range is an image of a first pattern from the first projection portion, and projecting the second adjustment image in which a part projected to the second range is an image of a second pattern from the second projection portion, and the image of the first pattern and the image of the second pattern are images in which a pattern of an overlapping image between the image of the first pattern and the image of the second pattern disappears in a case where the first range and the second range are matched.

(27) The projection method according to any one of (20) to (26), in which the processor executes, in a state of projecting the first adjustment image, a control of displaying guide information as a guide for a method of adjusting the relative position by referring to the first adjustment image, and in a state of projecting the second adjustment image, a control of displaying guide information as a guide for a method of adjusting the relative position by referring to the second adjustment image.

(28) The projection method according to (27), in which the processor executes, in a state of projecting the first adjustment image, a control of displaying the guide information as the guide for the method of adjusting the relative position by referring to the first adjustment image, by including the guide information in the first adjustment image, and in a state of projecting the second adjustment image, a control of displaying the guide information as the guide for the method of adjusting the relative position by referring to the second adjustment image, by including the guide information in the second adjustment image.

(29) The projection method according to any one of (20) to (28), in which the processor executes, in a state of projecting the second adjustment image, a control of receiving a first operation for adjusting the relative position and a second operation for correcting distortion of an image caused by projection of at least any of the first projection portion or the second projection portion from a user.

(30) The projection method according to (29), in which the processor executes, in a state of projecting the second adjustment image, a control of displaying guide information as a guide for a method of the first operation and guide information as a guide for a method of the second operation.

(31) The projection method according to (30), in which the processor executes, in a state of projecting the second adjustment image, a control of displaying the guide information as the guide for the method of the first operation and the guide information as the guide for the method of the second operation, by including the guide information in the second adjustment image.

(32) The projection method according to any one of (29) to (31), in which the projection system further includes a first operating part for receiving the first operation and a second operating part for receiving the second operation in a state of projecting the second adjustment image.

(33) The projection method according to (32), in which an operating part of at least any of the first operating part or the second operating part is an operating part for providing an instruction for processing different from the adjustment of the relative position and the correction of the distortion in a state of projecting the first adjustment image.

(34) The projection method according to (33), in which the processor executes, in a case where a change is made from a control of projecting the first adjustment image by the first projection portion and the second projection portion to a control of projecting the second adjustment image by the first projection portion and the second projection portion, a control of displaying information indicating that a function of at least any of the first operating part or the second operating part is changed.

(35) The projection method according to (34), in which the processor executes, in a state of projecting the second adjustment image, a control of displaying the information indicating that the function of at least any of the first operating part or the second operating part is changed, by including the information in the second adjustment image.

(36) The projection method according to (33), in which the processor executes, in a case where a change is made from a control of projecting the second adjustment image by the first projection portion and the second projection portion to a control of projecting the first adjustment image by the first projection portion and the second projection portion, a control of displaying information indicating that a function of at least any of the first operating part or the second operating part is changed.

(37) The projection method according to (36), in which the processor executes, in a state of projecting the first adjustment image, a control of displaying the information indicating that the function of at least any of the first operating part or the second operating part is changed, by including the information in the first adjustment image.

(38) The projection method according to any one of (20) to (37), in which the projection system further includes an instruction portion that receives an instruction from a user, and the processor executes, in accordance with a user instruction received by the instruction portion, a control of switching from a control of projecting the first adjustment image by the first projection portion and the second projection portion to a control of projecting the second adjustment image by the first projection portion and the second projection portion, or a control of switching from the control of projecting the second adjustment image by the first projection portion and the second projection portion to the control of projecting the first adjustment image by the first projection portion and the second projection portion.

(39) A control program of a projection system that projects a projection range of a first projection portion and a projection range of a second projection portion in a partially overlapping manner, the control program causing a processor included in the projection system to execute a process including performing a control of projecting a first adjustment image or a second adjustment image different from the first adjustment image from the first projection portion and the second projection portion and executing a control of adjusting a relative position between a first projection range of the first projection portion and a second projection range of the second projection portion in accordance with a received instruction.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2020-040022) filed on Mar. 9, 2020, the content of which is incorporated in the present application by reference.

EXPLANATION OF REFERENCES

1: projection portion
1*a*: first projection portion
1*b*: second projection portion
2: operation reception portion
2A, 3A: hollow portion
2*a*, 2*b*, 3*a*, 3*c*, 15*a*: opening
4: control device
4*a*: storage medium
6: screen
7*a*: first projection range
7*b*: second projection range
8*a*: overlapping region
10: projection system
12: light modulation unit
15: housing
21: light source
22: light modulation portion
23: projection optical system
24: control circuit
31: second optical system
32, 122: reflective member
33: third optical system
34: lens
51, 54: first adjustment image
52, 53, 55, 56, 72, 73, 75, 76: end part
60: remote controller
61: ten key
62: direction key
63: switching key
71, 74: second adjustment image
101: body part
102: first member
103: second member
104: projection direction changing mechanism
105: shift mechanism
106: optical unit
121: first optical system
G1: image

What is claimed is:

1. A projection system that performs projection so that a projection range of a first projection portion and a projection range of a second projection portion are partially overlapped with each other, the projection system comprising:

a processor configured to:

perform a control of shifting, from a first state in which a first adjustment image including an image of a first spatial frequency in at least a partial region of the first adjustment image is projected from the first projection portion and the second projection portion, to a second state in which a second adjustment image including an image of a second spatial frequency higher than the first spatial frequency in at least a partial region of the second adjustment image is projected from the first projection portion and the second projection portion; and execute a control of adjusting a relative position between a first projection range of the first projection portion and a second projection range of the second projection portion in accordance with a received instruction.

2. The projection system according to claim 1, wherein the partial region is a region at which the projection range of the first projection portion and the projection range of the second projection portion are overlapped with each other.

3. The projection system according to claim 1, wherein the processor is configured to execute the control of adjusting the relative position in accordance with an instruction received from a user.

4. The projection system according to claim 1, wherein the processor is configured to execute a control of performing first adjustment on the relative position in the first state, and performing second adjustment having a smaller displacement amount than the first adjustment on the relative position in the second state.

5. The projection system according to claim 1, wherein the adjustment of the relative position is adjustment of making a first range of the first projection range overlap with a second range of the second projection range.

6. The projection system according to claim 5, wherein the processor is configured to, in the first state, execute a control of projecting the first adjustment image in which a part projected to the first range is an image of the first spatial frequency from the first projection portion, and projecting the first adjustment image in which a part projected to the second range is the image of the first spatial frequency from the second projection portion, and in the second state, execute a control of projecting the second adjustment image in which a part projected to the first range is an image of the second spatial frequency from the first projection portion, and projecting the second adjustment image in which a part projected to the second range is the image of the second spatial frequency from the second projection portion.

7. The projection system according to claim 5, wherein the processor is configured to, in the first state, execute a control of projecting the first adjustment image in which a part projected to the first range has a first color from the first projection portion, and projecting the first adjustment image in which a part projected to the second range has a second color that is a complementary color to the first color from the second projection portion.

8. The projection system according to claim 5, wherein the processor is configured to, in the second state, execute a control of projecting the second adjustment image in which a part projected to the first range is an image of a first pattern from the first projection portion, and projecting the second adjustment image in which a part projected to the second range is an image of a second pattern from the second projection portion, and the image of the first pattern and the image of the second pattern are images in which a pattern of an overlapping image between the image of the first pattern and the image of the second pattern disappears in a case where the first range and the second range are matched.

9. The projection system according to claim 1, wherein the processor is configured to, in the first state, execute a control of displaying guide information as a guide for a method of adjusting the relative position by referring to the first adjustment image, and in the second state, execute a control of displaying guide information as a guide for a method of adjusting the relative position by referring to the second adjustment image.

10. The projection system according to claim 9, wherein the processor is configured to, in the first state, execute a control of displaying the guide information as the guide for the method of adjusting the relative position by referring to the first adjustment image, by including the guide information in the first adjustment image, and in the second state, execute a control of displaying the guide information as the guide for the method of adjusting the relative position by referring to the second adjustment image, by including the guide information in the second adjustment image.

11. The projection system according to claim 1, wherein the processor is configured to, in the second state, execute a control of receiving, from a user, a first operation for adjusting the relative position and a second operation for correcting distortion of an image caused by projection of at least any of the first projection portion or the second projection portion.

12. The projection system according to claim 11, wherein the processor is configured to, in the second state, execute a control of displaying guide information as a guide for a method of the first operation and guide information as a guide for a method of the second operation.

13. The projection system according to claim 12, wherein the processor is configured to, in the second state, execute a control of displaying the guide information as the guide for the method of the first operation and the guide information as the guide for the method of the second operation, by including the guide information in the second adjustment image.

14. The projection system according to claim 11, further comprising:

a first operating part for receiving the first operation and a second operating part for receiving the second operation in the second state.

15. The projection system according to claim 14, wherein an operating part of at least any of the first operating part or the second operating part is an operating part for providing an instruction for processing different from the adjustment of the relative position and the correction of the distortion in the first state.

16. The projection system according to claim 15, wherein the processor is configured to, in a case where a change is made from the first state to the second state, execute a control of displaying information indicating that a function of at least any of the first operating part or the second operating part is changed.

17. The projection system according to claim 16, wherein the processor is configured to, in the second state, execute a control of displaying the information indicating that the function of at least any of the first operating part or the second operating part is changed, by including the information in the second adjustment image.

18. The projection system according to claim 15, wherein the processor is configured to, in a case where a change is made from the second state to the first state, execute a control of displaying information indicating that a function of at least any of the first operating part or the second operating part is changed.

19. The projection system according to claim 18, wherein the processor is configured to, in the first state, execute a control of displaying the information indicating that the function of at least any of the first operating part or the second operating part is changed, by including the information in the first adjustment image.

20. The projection system according to claim 1, further comprising:

an instruction portion that receives an instruction from a user, and wherein the processor is configured to, in accordance with a user instruction received by the instruction portion, execute a control of switching from the first state to the second state, or a control of switching from the second state to the first state.

21. A projection method by a projection system that performs projection so that a projection range of a first projection portion and a projection range of a second projection portion are partially overlapped with each other, the projection method comprising:

by a processor included in the projection system, performing a control of shifting, from a first state in which a first adjustment image including an image of a first spatial frequency in at least a partial region of the first adjustment image is projected from the first projection portion and the second projection portion, to a second state in which a second adjustment image including an image of a second spatial frequency higher than the first spatial frequency in at least a partial region of the second adjustment image is projected from the first projection portion and the second projection portion; and executing a control of adjusting a relative position between a first projection range of the first projection portion and a second projection range of the second projection portion in accordance with a received instruction.

22. A non-transitory computer readable medium storing a control program of a projection system that projects a projection range of a first projection portion and a projection range of a second projection portion in a partially overlapping manner, the control program causing a processor included in the projection system to execute a process comprising:

performing a control of shifting, from a first state in which a first adjustment image including an image of a first spatial frequency in at least a partial region of the first adjustment image is projected from the first projection portion and the second projection portion, to a second state in which a second adjustment image including an image of a second spatial frequency higher than the first spatial frequency in at least a partial region of the second adjustment image is projected from the first projection portion and the second projection portion; and executing a control of adjusting a relative position between a first projection range of the first projection portion and a second projection range of the second projection portion in accordance with a received instruction.

* * * * *